United States Patent

Billieres et al.

[11] Patent Number: 5,433,042
[45] Date of Patent: Jul. 18, 1995

[54] METHOD AND APPARATUS FOR GRINDING TIRES

[75] Inventors: Jean Billieres, Clermont-Ferrand, France; Abelardo Cabestrero, Almeria, Spain

[73] Assignee: Compagnie Generale des Etablissements Michelin-Michelin & Cie, Clermont-Ferrand Cedex, France

[21] Appl. No.: 233,731

[22] Filed: Apr. 26, 1994

Related U.S. Application Data

[63] Continuation of Ser. No. 827,282, Jan. 29, 1992, abandoned.

[30] Foreign Application Priority Data

Feb. 6, 1991 [FR] France .................. 91 01418

[51] Int. Cl.⁶ ............................................. B24B 5/00
[52] U.S. Cl. .................................... 451/49; 451/307; 451/310
[58] Field of Search ...................... 51/135 R, 144, 145, 51/147, 106 R, 104, 165.9, 289 R, DIG. 33, 328

[56] References Cited

U.S. PATENT DOCUMENTS

| | | | |
|---|---|---|---|
| 2,197,077 | 4/1940 | Littlefield | 51/145 R |
| 2,649,665 | 8/1953 | Anderson | 51/104 |
| 2,651,893 | 9/1953 | Braley | 51/104 |
| 2,765,845 | 10/1956 | Bullis | 51/DIG. 33 |
| 3,095,674 | 7/1963 | Lee | 51/142 |
| 3,473,270 | 10/1969 | Byrnes et al. | 51/147 |
| 3,866,360 | 2/1975 | Monajjem | 51/DIG. 33 |
| 3,905,160 | 9/1975 | McKenney | 51/106 R |
| 4,139,041 | 2/1979 | Newton | 157/13 |

FOREIGN PATENT DOCUMENTS

| | | |
|---|---|---|
| 8803866 | 6/1988 | European Pat. Off. |
| 3934676 | 4/1991 | Germany |

Primary Examiner—Robert A. Rose
Attorney, Agent, or Firm—Brumbaugh, Graves, Donohue & Raymond

[57] ABSTRACT

In order to grind a tire 2 mounted on a vehicle, an abrasive belt 5 is used, which is stretched over rollers 51, 52, 53, 54 and 46 which are mounted on a frame 4. By the action of a jack 7, the tire 2 is released of all load. A counterweight 45 urges the frame 4 towards the tire 2. The force with which the abrasive belt 5 rests on the tire 2 can be adjusted to a very low value.

18 Claims, 2 Drawing Sheets

METHOD AND APPARATUS FOR GRINDING TIRES

This application is a continuation of application Ser. No. 07/827,282, filed on Jan. 29, 1992, now abandoned.

BACKGROUND OF THE INVENTION

The present invention relates to the grinding of tires. The invention proposes a method of grinding new or used tires and proposes a machine for the grinding on the vehicle of a tire which has previously been installed on the vehicle.

Tire grinding operations are well known and are described, for instance, in U.S. Pat. Nos. 3,943,806 and 4,936,054. The purpose of the grinding operation, as known in the state of the art, is to improve or restore a certain perfection of the shape of the tire so as to improve its uniformity; it is therefore done to decrease radial variation or imbalance.

The object of the present invention is to avoid the exponential increase of the rate of wear when signs of abnormal wear appear, or to decrease the rate of wear when the tire has molding defects. For this purpose, the invention proposes grinding the tire while respecting the basic harmonics of the out-of-roundness thereof (up to about harmonic 2).

Starting from the discovery that the rate of wear of a tire is not always linear, it has been observed that certain types of irregular wear can result in rapid acceleration of the rate of wear. The purpose of the invention is therefore to carry out a maintenance operation on the tire which consists of doing away with the incipient signs of irregular wear as soon as they are detected, or else a finishing operation which makes it possible to improve the geometrical character.

SUMMARY OF THE INVENTION

In accordance with the invention, the process for grinding a tire mounted on the rim and inflated to its rated pressure, driven in rotation, on which a grinding means acts, is characterized by the fact that the grinding means is applied to the tread with light constant pressure and by the fact that its constant average thickness is removed circumferentially by abrasion.

The use of the invention is of particular interest in the case of tires which have been in use on a vehicle on which signs of irregular wear have appeared. It is advisable to grind the tires as soon as possible, and therefore upon the commencement of the irregular wear. It has been found that it is sufficient to remove a very slight thickness of rubber, on the order of a few tenths of a millimeter, in order to maintain the rate of wear at its minimum and on the whole improve the mileage life of the tire, to the extent at times of doubling it. For example, the typical maximum thickness removed from new tires is between 2/10 of a mm and 4/10 of a mm. In the case of used tires, this thickness of course depends on the extent of the irregular wear which has already occurred. The removal, on the average, of a uniform thickness of rubber inherently results in the removal of local excess rubber left in molding, the removal of rubber adjacent areas of local wear, and in general an improvement in uniformity of the tire tread while preserving out-of-roundness. It may vary from a few tenths (for instance, 5/10 mm) up to 2 or 3 mm, and, in this latter case, it is again possible to use a tire which had become unusable before the grinding in view of the extent of its irregular wear which then causes extensive vibration or even defects in behavior of the vehicle.

In order to facilitate this operation as much as possible, the invention also proposes a grinding machine which can receive the tire to be ground while it remains mounted on the vehicle, which machine therefore can receive the tire somewhat in the manner of brake benches.

The machine of the present invention comprises an abrasive belt which can be placed in movement, means which make it possible to apply the abrasive belt against the tire with a light, strictly constant pressing force, and means for driving the tire in rotation, and it is intended to be used with a jack which makes it possible to relieve the tire from the entire load of the vehicle which it normally assumes. Of course, the jack can be incorporated in the machine.

DESCRIPTION OF THE DRAWINGS

The accompanying drawings provide a diagrammatic showing of a machine which makes it possible to explain the invention, applied in non-limitative manner to the grinding of used tires.

DESCRIPTION OF THE PREFERRED EMBODIMENTS

Figure 1:
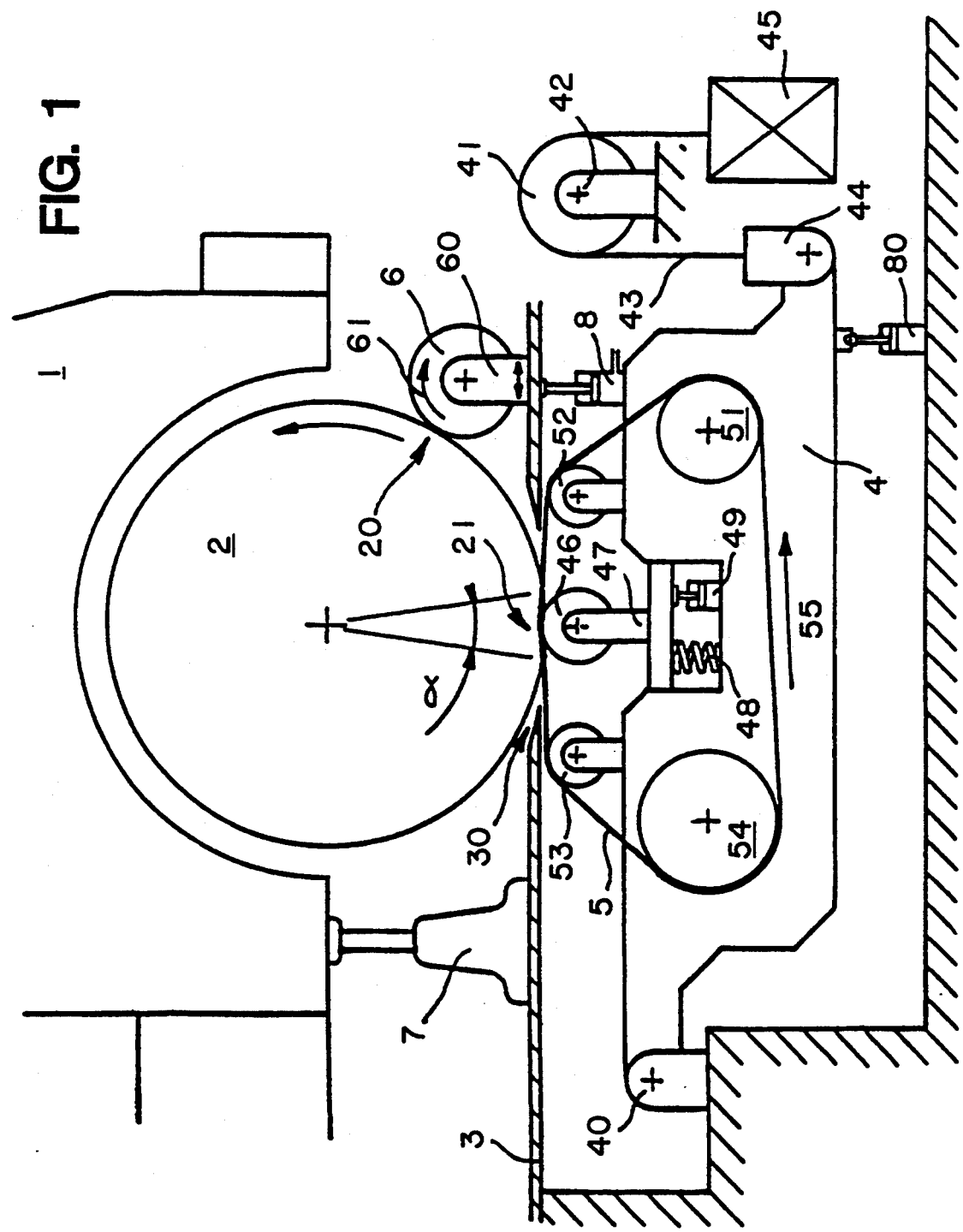
FIG. 1 is a side view of a vehicle in position on a machine according to the invention.

The machine proposed is designed so that the operation of grinding the tire can be carried out in any maintenance shop for vehicles like trucks, the type with which the invention is primarily concerned. The machine proposed can be incorporated in the floor of the shop, for instance, in a pit. The machine can also be arranged in an independent frame which is adapted to be placed on the floor of the shop, the vehicle having access to the tire-grinding station by means of a ramp.

The tire remains on the vehicle and initially the inflation pressure is adjusted to the rated value. The driver advances his vehicle 1 until the tire 2 overlies a trap or opening 30 in the floor 3 of the shop. A first rough adjustment for the position of the tire with respect to the machine is effected by the driver himself, who sees to it in particular that the tire 2 is straight ahead when it is positioned on the trap 30. If necessary, all desired fine adjustments can be incorporated in the machine. They are not shown or detailed in order not to overload the figures with details which are obviously within the scope of the person skilled in the art and which do not form part of the invention.

A frame 4 is articulated around a shaft 40 which is secured in the floor 3 supporting the vehicle 1 or, more generally, rigidly attached to the reference plane supporting the vehicle 1. A pulley 41 is mounted for free rotation around a second shaft 42, which is also secured in the floor 3 bearing the vehicle 1 just in front of the frame 4 at the end opposite the articulation shaft 40 of the frame. A cable 43 is attached to a lug 44 fastened for free rotation on the frame 4. The cable 43 is engaged on the pulley 41 and is attached to a counterweight 45.

An endless abrasive belt is mounted and stretched over 4 rollers 51, 52, 53, and 54, the axes of rotation of which are parallel to the axis of the tire 2 which is to be ground. The roller 54 is driven so as to place the abrasive belt 5 in movement in the direction indicated by the arrow 55.

In FIG. 1, the tire 2 itself is driven in rotation by a drive roller 6, the axis of which is parallel to the axis of the tire 2. The drive roller 6 is mounted on a support 60 which is slidably mounted on the floor 3 so that it can move the drive roller 6 toward or away from the tire 2. A jack 7 makes it possible to relieve the tire 2 from the entire load of the vehicle which it normally bears. The jack can therefore be placed below the frame of the vehicle or, preferably, below a part of the set of wheels concerned, for instance below the axle on which the tire 2 is mounted. The position of the jack 7 is indicated for purposes of illustration in FIG. 1, so that the figure shows all the main parts of the invention, but the actual position is that shown in FIG. 2.

Figure 2:
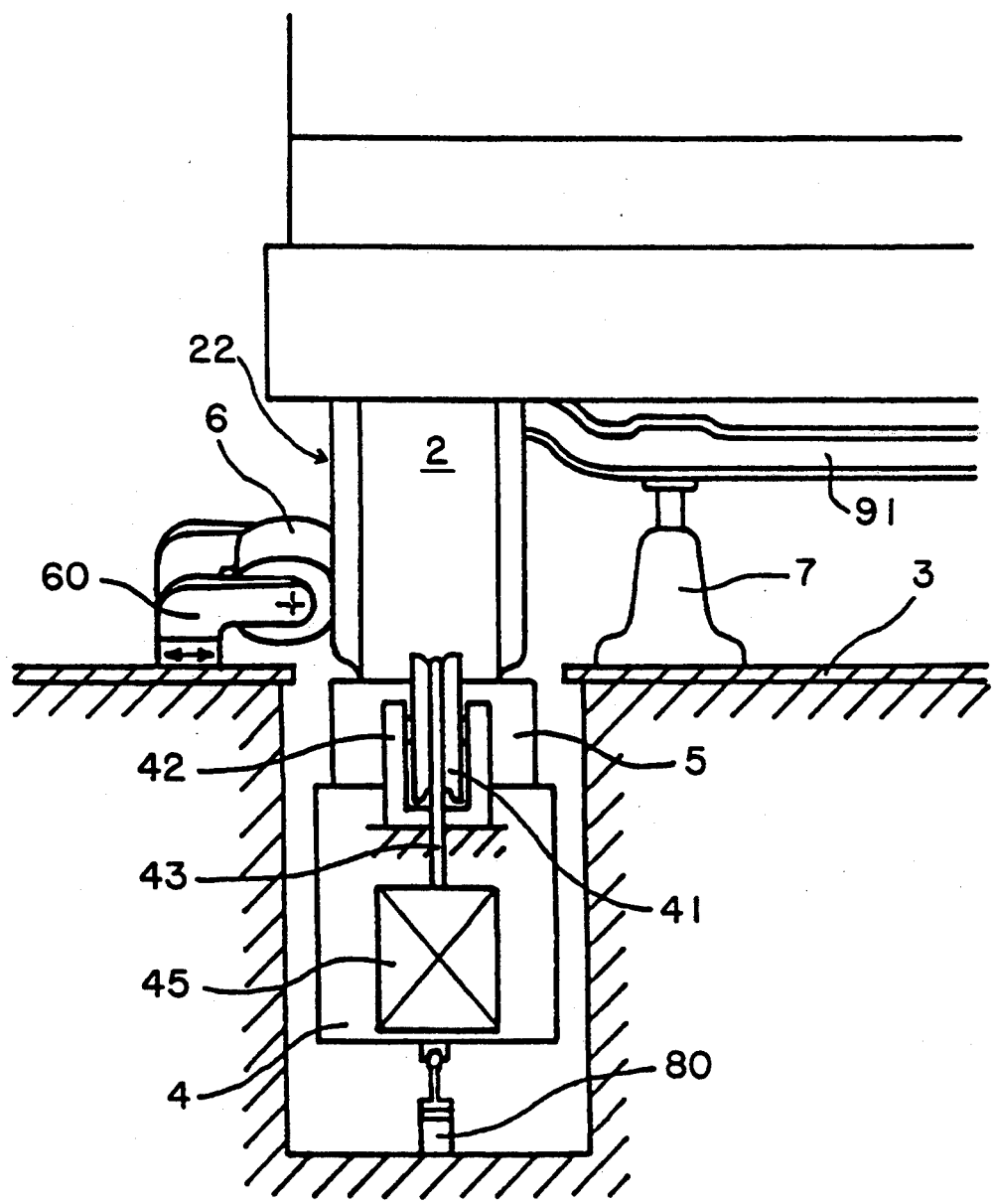
FIG. 2 is a front view of a vehicle in position on a variant machine in accordance with the invention.

In FIG. 2 it is seen that the second variant differs essentially by the driving in rotation of the tire 2; a roller 6, the axis of rotation of which is perpendicular to that of the tire 2, is mounted on a support 60 which is mounted for sliding on the floor 3 of the shop. The roller 6 is applied against the side 22 of the tire 2 in order to drive it in rotation. It is seen that the jack 7 acts on the rigid axle 91 of the vehicle. Otherwise, the machine shown in FIG. 2 is entirely similar to that shown in FIG. 1. The following description therefore concerns all of the aspects common to the two machines.

The drive roller 6 is driven in the direction 61, which will cause a driving of the tire 2 in the direction opposite the movement 55 of the abrasive belt 5. In passing, it may be pointed out that, in the same way as one at times employs the principle of down-cut milling, one can also drive the abrasive belt and the tire in the same direction, provided, of course, that there is a difference in linear speed. The drive roller 6 is placed against the tire 2 with a contact pressure which is as slight as possible and just sufficient to drive the tire 2 in rotation, including during the time that the tire is subjected to the action of the abrasive belt 5 which develops on the tire 2 a force which tends to reverse the direction of rotation of the tire. The drive roller 6 is brought against the tire at the point 20 which is at least 30° from the region 21 of the tire 2 which is subjected to the action of the abrasive belt 5.

It has been found that the direction of the grinding of the tread (direction of displacement of the abrasive belt 5 on the surface of the tread) could at times leave a mark in the form of a slight sawtooth configuration. In order to avoid this, it is sufficient to distribute the grinding over the two relative directions (reversal of all the movements at the middle of the grinding operation). If the tire to be ground presents sawtooth wear, such wear can be caused to disappear or be decreased by selecting the proper direction for the grinding operation.

These precautions (relief of the tire from load and resting of the tire on a single roller 6 at a sufficient distance from the grinding region) are directed at permitting the grinding operation of the tire 2 to reproduce as faithfully as possible all the defects in circularity of the tread having a harmonic of less than about 2. Thus, the maintenance operation proposed removes only a truly minimum layer of rubber. However, it is sufficient to effect the disappearance of all abnormal wear, creating for instance inclined faces on each block of the sculpturing. These forms of abnormal wear can be detected by simple visual inspection of the tires very early in the process of wear when they have already caused only a very slight local deepening of the wear. Most of the time, it is sufficient to remove merely a thickness of about 3/10 of a mm upon the appearance of symptoms of abnormal wear in order to maintain the tire within a zone of operation in which the wear phenomena remain at their minimum rate.

The counterweight 45 is adjusted in such a manner that the force with which the abrasive belt 5 rests against the tread of the tire is very slight, preferably less than 20 dN, so as to do away with the facets of abnormal wear while respecting the defects in circularity of the tread. The resting face on the tire is preferably applied to the abrasive belt 5 by a counter-roller 46 having the transverse profile of the tire to be ground, and the width of the abrasive belt is equal to the width of the tread. The counter-roller 46 is preferably mounted on a support 47 connected to the frame 4 by an assembly having a spring 48 and a dashpot 49. Furthermore, a dashpot 80 is arranged between the frame 4 and the floor (or the frame surrounding the machine) in order to dampen the movements of the frame 4. An entire set of counter-rollers 46 is kept in stock since one counter-roller 46 corresponds to one type of tire, or to a few types of tires. The rollers 52 and 53 may also have a spool shape with a slight reduction of the diameter in the central part.

In the grinding operation, the grinding means, namely the abrasive belt 5, acts at all times on a very small arc $\alpha$ corresponding substantially to the length of a basic pattern of the tread design in the case of sculpturings formed of circumferentially arranged blocks of rubber. On the average, that is to say considering an arc at least equal to this arc $\alpha$, a constant thickness of rubber is removed. In other words, contrary to the known grinding operations in which very different thicknesses can be removed depending on the circumferential position in question, the circumferential uniformity of the depth of sculpture is respected. In order further to improve the uniformity of the grinding operation, the counter-roller 46 can be developed so as to float transversely (that is to say, in the direction of its axis of rotation).

A grinding operation makes it necessary to subject the tire to several revolutions while it is subjected to the action of the abrasive belt 5. It is, of course, possible to completely automate the action of the machine.

An optical device (not shown) faces the side of the tire on which a white line has been drawn with a grease pencil, seeing to it that this line is oriented in approximately radial direction. At the start, a pneumatic jack 8 pushes the frame 4 downward against a stop; there is therefore no contact between the tire 2 and the abrasive belt 5; a slight play is left, on the order of 1 or 2 mm. When the optical device detects the passage of the line, the feed of the jack 8 is connected to the atmosphere so that, under the action of the counterweight 45, the abrasive belt comes into contact with the tread. The tire is driven by the drive roller 6 or 6 bis at a speed of about 10 rpm. After a pre-established number of revolutions of the tire, for instance after 10 revolutions, the optical device effects the connecting of the source of compressed air to the jack 8 so as to free the abrasive belt.

At this stage, simple visual inspection makes it possible to decide whether the grinding has been sufficient (all defects have disappeared) or whether an additional pass should be carried out.

We claim:

1. A method of grinding a tire mounted on a rim and inflated to its rated pressure in order to reduce local defects in the sculpturing of the tread caused by abnormal wear or defects in molding while intentionally preserving out-of-roundness in the circularity of the tire tread in consideration to the basic harmonics of the tire comprising rotating the tire at a uniform speed of rotation while the tire is mounted on the wheel of the vehicle, applying a grinding means having a transverse surface against the tread over a small arc with a light constant pressure for removing, on the average, a uniform thickness of rubber from the circumference of the tread as the tire rotates relative to the grinding means and conforming the transverse surface of the grinding means generally to the profile of the tread which it engages, the removal, on the average, of a uniform thickness from the circumference of the tread reducing local defects by improving uniformity of the tire tread while preserving the out-of-roundness.

2. A method according to claim 1, characterized by the fact that the grinding means is applied to a tire which has been in use on a vehicle and subjected to excessively irregular wear.

3. A method according to claim 2, in which a total of 5/10 mm to 3 mm in radial thickness is removed from the tire upon several revolutions of the tire.

4. A method according to claim 1, in which the grinding means is applied to a new tire and a total of 2/10 of a mm to 4/10 mm of the radial thickness of the tire is removed in several revolutions of the tire.

5. A method according to claim 1, in which the grinding means is applied to a tire which is not under load.

6. A method according to claim 1, in which the grinding means is applied to a tire mounted on a vehicle.

7. An apparatus for grinding a tire mounted on a rim and inflated to its rated pressure in order to reduce local defects in the sculpturing of the tread caused by abnormal wear or defects in molding while intentionally preserving out-of-roundness in the circularity of the tread comprising means rotating the tire at a uniform speed of rotation while the tire is mounted on the wheel of the vehicle, grinding means applied against a small arc of the tread, said grinding means having a transverse surface conforming generally to the profile of the tread which it engages, and means urging the grinding means against the tread with a light constant pressure as the tire rotates to remove, on the average, a uniform thickness of rubber from the circumference of the tread as the tire rotates relative to the grinding means, the removal, on the average, of a uniform thickness from the circumference of the tread reducing local defects by improving uniformity of the tire tread while preserving the out-of-roundness.

8. An apparatus according to claim 7, characterized by the fact that the tire rotating means includes a drive roller driven in rotation and placed against the tire with a light contact pressure just sufficient for rotating the tire, the roller being placed against the tire at a position at least 30° away from the region of the tire subjected to the action of the abrasive belt.

9. An apparatus according to claim 7, including at least two rollers for guiding the abrasive belt in a closed path, the axis of rotation of each roller being parallel to the axis of the tire to be ground, and means driving one of the rollers, the abrasive belt being placed in movement in a direction opposite the movement of the tire when it is driven in rotation.

10. A machine for grinding a tire which is mounted on a vehicle and inflated to its rated pressure, comprising an abrasive belt which is adapted to be placed in movement, means for receiving the tire above the abrasive belt and applying the abrasive belt against the tire with a light and constant pressing force, means for driving the tire in rotation and means for relieving the tire of the entire load of the vehicle which it normally bears and in which the means for applying the abrasive belt with a light and constant pressing force includes a frame supporting the abrasive belt and articulated at one end around a shaft and suspended at the other end by a counterweight compensating for the weight of the frame and the elements which it bears, and imparting to the abrasive belt the light constant pressing force against the tire oriented vertically and directed upward.

11. A machine according to claim 10, in which the means for applying the pressing force includes a counter-roller having the transverse profile of the tire to be ground.

12. A machine according to claim 11, in which the counter-roller is mounted on a support connected to a frame by an assembly which includes a spring and dashpot.

13. A machine according to claim 11, in which the counter-roller floats transversely relative to the frame.

14. A machine according to claim 10, in which the movements of the frame are damped by a dashpot.

15. A method as set forth in claim 1 in which the grinding means is an abrasive belt held in engagement with the tread by a roller having a profile which imparts to the belt the transverse surface conforming generally to the profile of the tread which the belt engages, moving the belt in a continuous path determined by the roller and guide means supported on a frame and applying the light constant pressure to the belt through the frame and the roller supported on the frame.

16. A method as set forth in claim 15 in which the light constant pressure is applied through damping means between the roller and the frame.

17. An apparatus as set forth in claim 7 in which the grinding means is an abrasive belt beneath the tire, means for moving the belt in a continuous path and including a roller having a profile which imparts to the belt a transverse surface conforming generally to the profile of the tread which the belt engages and in which the means urging the belt against the tread with a light constant pressure acts through the roller to lift the belt against the tire tread.

18. An apparatus as set forth in claim 17 including a movable frame for supporting the roller and guide means and in which the means urging the belt against the tread acts through the movable frame and the roller supported on the frame and including damping means intermediate the roller and the frame.

* * * * *